(No Model.)

L. KALLING.
BOTTLE SEALING DEVICE.

No. 590,578. Patented Sept. 28, 1897.

WITNESSES
Dan'l Fisher
H. Constantine

INVENTOR
Lewis Kalling,
by W. T. Howard,
Atty.

THE NORRIS PETERS CO., PHOTO-LITHO., WASHINGTON, D. C.

UNITED STATES PATENT OFFICE.

LEWIS KALLING, OF BALTIMORE, MARYLAND.

BOTTLE-SEALING DEVICE.

SPECIFICATION forming part of Letters Patent No. 590,578, dated September 28, 1897.

Application filed January 27, 1897. Serial No. 620,873. (No model.)

*To all whom it may concern:*

Be it known that I, LEWIS KALLING, of the city of Baltimore, in the State of Maryland, have invented certain Improvements in Bottle-Sealing Devices, of which the following is a specification.

This invention consists, first, in the formation of a joint between the bottle-head and the sealing-cap by means of a compressible gasket, which is so drawn and flattened as to present only a feather or knife edge to any liquid that may pass over the bottle-lip or between the lip and the inner surface of the cap, with which the said lip is practically in contact. By this means rubber or any other substance which is well adapted as a joint-forming material may be used without danger of its contaminating or injuriously affecting the contents of the bottle, as will hereinafter fully appear.

The said invention consists, secondly, in the combination, with a bottle having a lip with an inclined, beveled, or rounded exterior surface, of a flexible sealing-cap of such shape that when it is brought in contact with the upper end or edge of the bottle-lip it will stand away from the said inclined, beveled, or rounded surface and thereby form a space for an annular compressible gasket, as hereinafter more particularly described.

In the further description of the said invention which follows reference is made to the accompanying drawings, forming a part hereof, and in which—

Figure 1:
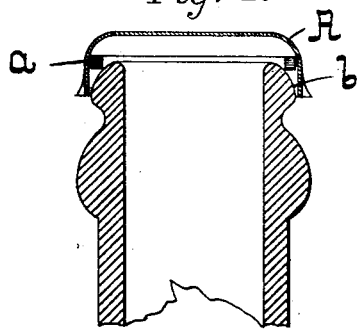
Figure 4:
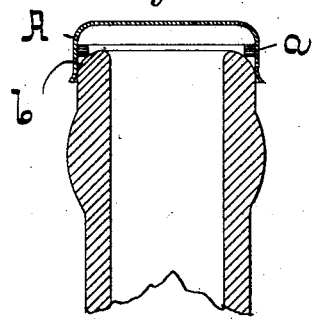
Figure 2:
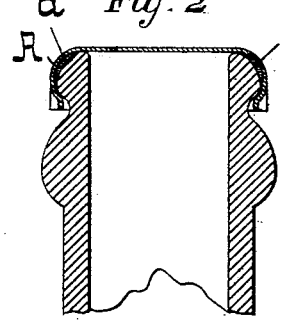
Figure 7:
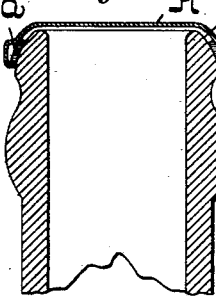
Figure 5:
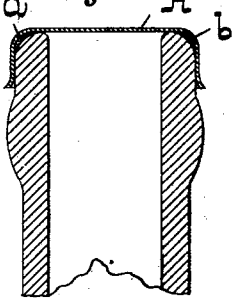
Figure 3:
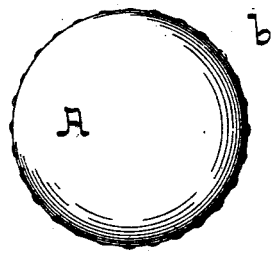
Figure 8:
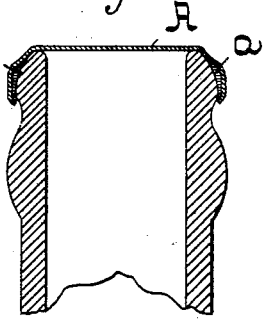
Figure 6:
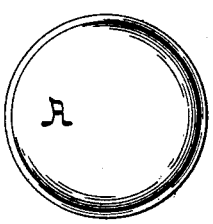
Figure 9:
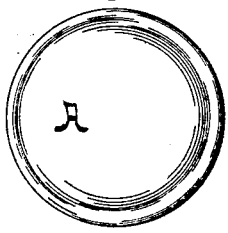

Figure 1 is a vertical section of the upper part of a bottle and a sealing-cap of the character shown and described in Letters Patent No. 468,226, granted on the 2d day of February, 1892, to William Painter, for bottle-sealing devices, the same being provided with a joint-forming gasket in accordance with the present invention and illustrating the position of the gasket before the same is compressed. Fig. 2 is a view similar to Fig. 1, except that the cap and gasket are shown in the positions which they occupy after the joint is formed. Fig. 3 is a top view of the cap. Figs. 4, 5, and 6 show the invention as applied to the sealing device patented to George A. Boyden March 6, 1894, under No. 515,990. Figs. 7, 8, and 9 illustrate the application of the present invention to the bottle-sealing device patented to me on the 9th day of June, 1896, and numbered 561,792.

In the Painter patent referred to the flange portion of the sealing-cap A is corrugated, the corrugations being divided into classes, termed in the specification the "inner" and the "outer" ones, and the cap is secured to the bottle by forcing the inner corrugations under a shoulder formed on the bottle-neck.

Instead of the sealing-disk shown in the Painter patent I place within the cap, which does not fit the outer surface of the bottle-lip, immediately below its extreme end, an annular gasket *a* of some compressible substance, preferably rubber, which has an inner diameter greater than that of the upper edge of the lip of the bottle. This gasket, as the cap is forced down and its inner surfacce brought into contact with the extreme upper edge of the bottle-lip, is confined in a space between the cap and the surface *b* of the bottle-lip formed by the difference in configuration of the two parts and is flattened and spread over a large portion of the said inclined surface, its upper end forming a feather or knife edge below the extreme end of the bottle-head. By this means, while the joint formed between the glass and the metallic cap may not be water-tight, the portion of the gasket exposed to the liquid in the bottle has practically no thickness, and it cannot therefore in any way affect it. The substitution of this annular gasket made of some cheap substance, such as rubber, for a cork disk very materially cheapens the sealing device without detracting in any manner from its efficiency. It will be seen that the lower end of the gasket is also feather or knife edged; but this is only incidental to the shape of the shoulder and the cap, and the result will be the same if the thickness of the gasket at the center be continued to the bottom, as it is not in contact with the liquid in the bottle. From the foregoing it will be understood that the distinguishing feature of this joint is the contact of the cap with the bottle and the drawing of the gasket so as to produce a knife-edge at its upper end, which is on the exterior rounded or beveled surface of the bottle-lip.

While I have stated that the inner surface of the cap is in contact with the extreme end of the bottle-lip, I do not debar myself from coating the inner surface of the cap with some innocuous varnish made from paraffin or some suitable resinous substance to prevent the contents of the bottle coming into contact with the metal of the cap, the intention of the invention being to dispense with a disk or gasket which is inserted in the cap to form a joint between its inner surface and the extreme end of the bottle-lip.

The employment of a disk between the upper edge of the bottle and the cap would in the compressing operation to which the gasket is subjected cause a portion of the same to enter to some extent the throat of the bottle and bring it into contact with the liquid therein, a result which with my invention is entirely obviated.

The Boyden cap shown in Figs. 4, 5, and 6 is held to the bottle-head by friction alone, the head of the bottle being ground to give it accuracy in diameter and a true surface, over which the cap is drawn in the joint-forming operation.

The gasket $a$ is applied to the Boyden cap in the same manner as to the Painter cap and presents a knife-edge to any liquid which may pass over the bottle-lip.

To adapt the gasket to my patented cap, which is shown in Figs. 7, 8, and 9, the gasket is made somewhat wider than the hollow bead in the cap, as shown in Fig. 7, so that in the compressing operation a portion of the gasket will pass upward toward the end of the lip of the bottle and terminate in a knife-edge, as shown in Fig. 8.

By reference to the drawings it will be seen that in all cases the curvature or configuration of the inner surface of the sealing-cap differs from that of the outer surface of the bottle-lip immediately below the extreme end thereof, so that a space is left for an annular gasket.

I have illustrated the application of my invention to three distinctive types of sealing-caps, but it is evident that it is applicable to others, provided the cap is made to stand away from the inclined, beveled, or rounded outer surface of the bottle-lip, so as to give space for an annular gasket, which is compressed in the said space.

I claim as my invention—

A bottle having a lip with an inclined, beveled or rounded exterior surface, and a flexible sealing-cap the annular wall of which immediately below the crown thereof has an inclination, bevel or curvature different from that of the exterior of the lip of the bottle so as to form an annular space immediately below the upper edge of the lip, but which annular wall at its lower edge is in contact with and clamps the bottle-head, combined with an annular compressible gasket which is inclosed within and entirely fills the said space, substantially as specified.

LEWIS KALLING.

Witnesses:
WM. T. HOWARD,
DANL. FISHER.